United States Patent [19]

Davis et al.

[11] 4,352,183
[45] Sep. 28, 1982

[54] INFORMATION TRANSMISSION SYSTEM

[75] Inventors: Christopher K. Davis, Crawley; Richard F. Mitchell, Merstham, both of England

[73] Assignee: U.S. Philips Corporation, New York, N.Y.

[21] Appl. No.: 201,865

[22] Filed: Oct. 29, 1980

[30] Foreign Application Priority Data

Sep. 11, 1979 [GB] United Kingdom ................. 7938975
Mar. 13, 1980 [GB] United Kingdom ................. 8008510

[51] Int. Cl.³ .......................................... G06F 11/10
[52] U.S. Cl. .......................................................... 371/33
[58] Field of Search ..................... 371/33, 32; 455/161

[56] References Cited

U.S. PATENT DOCUMENTS

| | | | |
|---|---|---|---|
| 3,676,846 | 7/1972 | Busch | 371/33 |
| 3,754,211 | 8/1973 | Rocher et al. | 371/33 |
| 4,093,823 | 6/1978 | Chu | 371/33 |

Primary Examiner—Charles E. Atkinson
Attorney, Agent, or Firm—Thomas A. Briody; William J. Streeter; Edward W. Goodman

[57] ABSTRACT

In order to make optimum use of the available transmission channels in an information transmission system, such as a trunked mobile ratio transmission system, where a number of uncoordinated users may wish to signal to a central control point in addition to using the channels for another purpose, the central control point monitors the channels and, when a channel is or becomes free, sends a command signal on that channel. When a user who is waiting to signal receives the command signal he chooses one of a predetermined number of immediately following time slots in an effectively random manner and sends his request in that slot in digital message form. The central control point sends an acknowledgement in the next time slot if and only if it receives the request in an error-free manner. If a user does not receive such an acknowledgement in response to the transmission of such a request he tries again when he receives the next command. The channel is used for other purposes, if necessary, at times other than those occupied by a command signal plus the subsequent predetermined number of time slots. If requests from more than one user should clash in the same time slot they will not be received by the control point in an error-free manner, this being determined by means of error check bits provided in the request message.

3 Claims, 13 Drawing Figures

INFORMATION TRANSMISSION SYSTEM

BACKGROUND OF THE INVENTION

This invention relates to an information transmission system comprising a first transmitter/receiver and a plurality of further transmitter/receivers which can each communicate with the first transmitter/receiver over the same transmission channel or group of transmission channels.

An example of such a system is a trunked mobile radio transmission system in which the first transmitter/receiver is a base or central control station and the further transmitter/receivers are the various mobile radios, the number thereof being larger than the number of radio channels available. If only radio access is required the base station in such a system may, in addition to its system control function, act only as a multichannel repeater. If land line connections are also required the base station will also have to include means for connecting any of the land lines to any of the radio channels. In order to enable the base station to perform its control function facilities must be provided for signalling to occur between the various mobile radios and the base station when a call is requested and a channel is assigned for that call. In small such systems (in which for example a number of channels between 1 and 5 is available) it is inefficient to assign one channel for signalling permanently, and in such systems it is preferably arranged that all channels can be used both for signalling and for speech.

SUMMARY OF THE INVENTION

It is an object of the invention to enable this to be done in an efficient manner.

The invention provides an information transmission system comprising a first transmitter/receiver and a plurality of further transmitter/receivers which can each communicate with the first transmitter/receiver over the same transmission channel or group of transmission channels. The first transmitter/receiver is constructed to respond to the occurrence of a predetermined state of the system, including one of the channels being free, by transmitting a command signal having a limited duration on one of the free channels. Each of the further transmitter/receivers are activatable to respond to reception of the command signal and are constructed to transmit on the same channel, when so activated, a digital information message including error checking bits in an effectively arbitrary one of a predetermined number of time slots which follow reception thereby of the command signal and which precede the transmission of a next command signal by the first transmission/receiver. The first transmitter/receiver is constructed to respond to reception of each of the digital information messages in an error-free manner by transmitting on the same channel, before the transmission thereby of the next command signal, an acknowledgment signal in such manner that it can be recognized by the further transmitter/receiver which transmitted the corresponding message as having been transmitted in response to the reception by the first transmitter/receiver of that message. Each of the further transmitter/receivers are constructed to respond to the reception thereby of the next command signal following transmission thereby of the digital information message by retransmitting that digital information message in a arbitrary one of a predetermined number of time slots which follow the reception thereby of the next command signal and which precede the transmission of any further command signals by the first transmitter/receiver if the acknowledgement signal is not transmitted in the meantime by the first transmitter/receiver in response to the first transmission of that digital information message.

It has now been recognized that efficient use can be made of each available transmission channel in an information transmission system of the kind in which a plurality of users (the "further transmitter/receivers") require access to a base station (the "first transmitter/receiver") from time to time in an uncoordinated manner, if the users transmit their signals to the base station only in response to the transmission of a command signal by the base station, if the user signals are each transmitted in a randomly chosen one of a predetermined number of time slots following the reception of the command signal, if a command signal is generated as often as possible consistent with a free channel being available therefor, if the user signals are provided with error-checking bits enabling the base station to determine whether or not a user signal has been received in an error-free manner and hence if two or more user signals have clashed, if the base station acknowledges all user signals which are received in an error-free manner, and if all users which have transmitted a signal but which have not received an acknowledgment try again when the next command signal is transmitted.

Each transmission channel may be, for example, a pair of radio frequencies (one for transmission to the first transmitter/receiver and one for transmission from the first transmitter/receiver) or a single radio frequency. Alternatively it may be, for example, a land line or pair of land lines.

The time elapsing before those further transmitter/receivers, which do not receive an acknowledgment signal in response to the transmission thereby of a given digital information signal, are allowed to try again, may be minimized if the first transmitter/receiver is constructed to respond to the occurrence of said predetermined state of the system by transmitting a predetermined limited sequence of command signals on the same free channel in such manner that the successive command signals of the sequence will be spaced in time by an interval, the duration of which is at least equal to the time occupied by said predetermined number of time slots. Alternatively, the first transmitter/receiver may be constructed to respond to the occurrence of said predetermined state of the system by transmitting only one command signal.

The acknowledgment signal may be made recognizable by the further transmitter/receiver which transmitted the corresponding message, as having been transmitted in response to reception by the first transmitter/receiver of that message merely by constructing the first transmitter/receiver to respond to reception of each digital information message in an error-free manner by transmitting the corresponding acknowledgment signal in the immediately following time slot, or in a further time slot which immediately follows the final time slot of said predetermined number of time slots if said message should be received in an error-free manner in said final time slot. Alternatively, or in addition, it may include identification information.

Synchronization of the system can be facilitated by arranging that all the time slots of said predetermined number of time slots have the same duration and follow each other without intervals between them, the further time slot (if present) also having this duration and occurring immediately after the final time slot of the predetermined number of time slots.

The use of each available transmission channel can be optimized when each digital information message constitutes a request for information transmission involving transmission between the relevant further transmitter/receiver and the first transmitter/receiver, if the first transmitter/receiver is constructed to respond to reception of said message in an error-free manner by assigning, subsequent to the transmission of the relevant acknowledgment signal, the channel on which said message is received to the information transmission requested, provided that no other one of said channels (if present) is then free and no other such request has higher priority.

It should be noted that the article "Analysis and Application of Framed ALOHA Channel in Satellite Packet Switching Networks—FADRA Method" by H. Okada, Y. Igarashi and Y. Nakanishi in "Electronics and Communications in Japan" Vol. 60-B, No. 8, 1977 discusses a transmission system between a satellite and ground stations employing a multi-access broadcast channel which is slotted in time. In this known system information packets generated by the various ground stations are of a fixed length which can be accommodated in one slot. A fixed number L of successive slots is defined as a "frame", and a packet generated during a given frame has random access to each slot in the next frame, i.e. the probability that it is transmitted in a given slot of the next frame is 1/L. The packets are synchronously transmitted and collided packets are randomly retransmitted in arbitrary frames after the current frame. Each ground station is capable of generating at most one packet in one frame, including those packets to be retransmitted.

DESCRIPTION OF THE DRAWINGS

An embodiment of the invention will now be described, by way of example, with reference to the accompanying diagrammatic drawings in which.

DESCRIPTION OF THE PREFERRED EMBODIMENT

Figure 1:
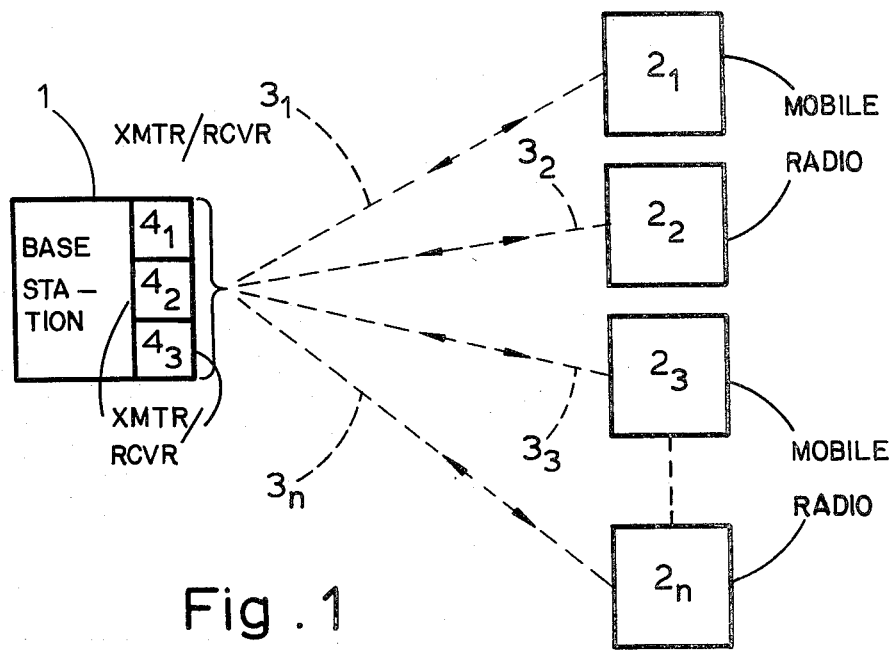
FIG. 1 is a block diagram of the embodiment.

FIG. 1 shows an information transmission system in the form of a trunked mobile radio transmission system comprising a base station 1 and n mobile radios $2_1$, $2_2$, $2_3 \ldots 2_n$. Base station 1 acts as a repeater when speech transmission is taking place between the various mobile radios 2, all transmissions being via the base station 1. To this end two-way transmission is possible between the base station 1 and each mobile radio $2_n$ over a respective transmission path $3_1$, $3_2$, $3_3 \ldots 3_n$, transmission over each path 3 being possible via a limited number of transmission channels, for example three transmission channels, which are the same for each path 3 and may each be in the form, for example, of a transmission carrier frequency pair or a pair of time multiplex transmission channels. It will be assumed that each channel is in the form of a transmission carrier frequency pair. The base station 1 includes in known manner a transmitter/receiver pair for each transmission channel, these being shown diagrammatically as blocks $4_1$, $4_2$ and $4_3$ respectively. Each mobile radio $2_n$ comprises a single transmitter/receiver pair which can be tuned to any transmission channel.

In addition to acting as a repeater station for speech transmissions between the various mobile radios 3, the base station 1 also controls the traffic of information within the system. To this end, in order to enable the various mobile radios 2 to signal their needs to the base station 1, and in order to enable the base station 1 to signal instructions to the various mobile radios 2, the base station 1 continuously monitors the various channels to determine whether or not they are occupied by a speech transmission. When it determines that a given channel is not occupied, it transmits a succession of digital information entities or messages, together with a pilot tone having a predetermined frequency, on the unoccupied channel, the pilot tone indicating to the mobile radios 2 that this channel is to be treated temporarily as a signalling channel. (If more than one channel is not occupied at a given time the messages and pilot tone are transmitted on only one of the unoccupied channels). When each mobile radio $2_n$ is not engaged in speech transmission, it is arranged to sequentially and repeatedly scan the various channels, i.e. to tune its transmitter/receiver pair to each channel in turn in a cyclic manner, and to continue to do so until it receives the pilot tone from the base station 1 on one of them. When such a pilot tone is received the relevant mobile radio $2_n$ is arranged to cease its channel scanning operation and stay tuned to the signalling channel for as long as the pilot tone continues to be transmitted thereon. Thus at all times when at least one channel is free, the base station 1 is transmitting a pilot tone on one free channel and all mobile radios 2 which are not engaged in speech transmission at the relevant time are tuned to the relevant free channel (after the short time required for each mobile radio $2_n$ to "find" the signalling channel).

Figure 2:
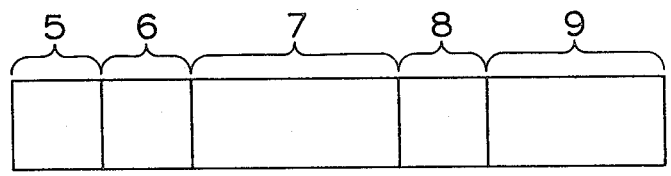
FIG. 2 shows the format employed for certain digital information messages in the embodiment of FIG. 1.

Each of the digital information entities or messages has the format shown in FIG. 2. As shown in FIG. 2, each such message from the base station 1 comprises a preamble 5, a "header" 6, the actual information 7, a parity-checking portion 8 and a postamble 9. The preamble 5 is provided for synchronization purposes at the mobile radios 2 as is the postamble 9; each of these portions may comprise a succession of alternating binary "1"s and "0"s, the preamble comprising, for example, 16 bits and the postamble 32 bits. The "header" 6, for example, of 16 bits, is a specific bit combination which is recognizable as such by the mobile radios 2 and indicates thereto that the immediately following portion 7, for example of 40 bits, constitutes actual information.

The parity checking portion 8 of, for example, 16 bits is used in a conventional manner by the mobile radios 2 to check that the information portion 7 has been received without error. With the above lengths for the various message portions and a transmission rate of, for example, 1200 bits/second, each message will last for 100 ms.

Figure 3:
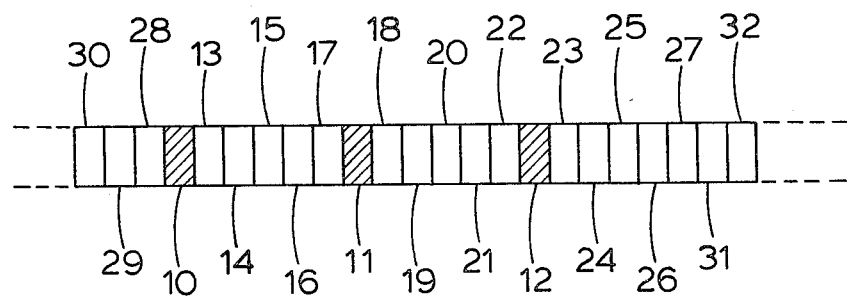
FIG. 3 illustrates the form of a signal occurring in the embodiment of FIG. 1.

The succession of 100 ms messages, each having the format shown in FIG. 2, transmitted together with the pilot tone by the base station 1 when it determines that a given channel is unoccupied, is shown diagrammatically in FIG. 3. The succession includes three "transmit needs" command messages 10, 11 and 12, respectively (shown shaded), which are separated by groups of five other messages 13-17 and 18-22, respectively. The messages 13 and 18, and a further message 23, are standard "channel identification" messages, the pilot tone transmitted with which ensures that the unoccupied mobile radio 2 stay tuned to the signalling channel, and the messages 14-17, 19-22, and further messages 24-27 may be either further such "channel identification" messages or "acknowledgement" messages (see below). The message 10 is preceded by a sufficient number of further messages 28, 29, 30 . . . (plus pilot tone), for example further "channel identification" messages, the information content of which is in fact immaterial, to ensure that all the mobile radio 2 not engaged in speech transmission will have "found" the signalling channel by the time that the first "transmit needs" command message 10 is transmitted.

The information content portion 7 (FIG. 2) of each "transmit needs" command message 10, 11 and 12 is the same and is a predetermined succession of (forty) bits which the mobile radio 2 are arranged to identify as such. Each mobile radio $2_n$, which is locked onto the signalling channel and the operator of which has indicated that he wishes to communicate with another of the mobile radios 2 by, for example, pressing a call button and entering details of the other mobile radio $2_n$ he wishes to call, is arranged to respond to reception of the first "transmit needs" command message 10 by transmitting, on the return path of the corresponding channel, a "call request" digital information message in a 100 ms period chosen at random from the next four 100 ms periods, i.e. those in which the messages 13-16 are transmitted by the base station 1. The "call request" message transmitted by each such mobile radio $2_n$ has the same format as that shown in FIG. 2, except that the 32 postamble bits are not sent, and contains (in its information portion corresponding to portion 7 in FIG. 2) all the relevant information required by the base station 1 to set up the call, e.g. information identifying the caller and the required destination; a predetermined group of bits in the information portion 7 may be assigned to the caller information and another predetermined group of bits therein may be assigned to the destination information. Moreover, the information portion of the "call request" message contains a bit pattern recognizable by the base station 1 and signifying that the message is in fact a "call request" message. The base station 1 determines, using the bit pattern and the parity checking bits, whether each such message received is an error-free "call request" message and, if it is, stores the information portion of the message and transmits an "acknowledgment" message (plus pilot tone) in the next 100 ms time slot, i.e. as one of the messages 14-17. (Each "acknowledgment" message contains, in its information portion 7 (FIG. 2) the number of the mobile radio $2_n$ whose call is being acknowledged and a bit pattern recognizable by the mobile radios 2 and signifying that the message is in fact an acknowledgment message.) If, on the other hand, the received message is not error-free (which is likely to be the case inter alia if two or more mobile radios 2 transmit their messages in the same time slot) or if no message is transmitted by a mobile radio $2_n$ in the relevant time slot, the message transmitted by the base station 1 in the next time slot is merely a standard "channel identification" message (plus pilot tone) the content of the information portion 7 of which is irrelevant. Thus, for example, if one mobile radio $2_n$ transmits a "call request" message while the base station 1 is transmitting the "channel identification" message 13, the message 14 will be an "acknowledgment" message if the "call request" message is received error-free. Otherwise, if no mobile radio $2_n$ or more than one mobile radio $2_n$ transmits a "call request" message when the base station 1 is transmitting the ("channel identification") message 13, the message 14 will be a "channel identification" message.

If a mobile radio $2_n$ after having transmitted a "call request" message in one of the time slots 13-16, receives a relevant "acknowledgment" message (which would be transmitted by the base station in the next time slot) it awaits further instructions from the base station 1. However, if such an "acknowledgment" message is not received, it responds to the next "transmit needs" command message 11 transmitted by the base station 1 in the same way as that in which it responded to the message 10, and the base station 1 responds to error-free reception thereof in a similar way. If the mobile radio $2_n$ receives an "acknowledgment" message in response to its second transmission, it awaits further instructions from the base station 1; otherwise it responds in a similar manner to the third "transmit needs" message 12.

After the message 27 has been transmitted by the base station the base station 1 operates to set up those calls (if any), "call request" messages which have been received in an error-free manner, stored, and not yet been set up, until either all these calls have been set up, or all channels have become assigned to speech. To this end, the base station 1 then transmits an even number of further messages 31, 32, . . . each again having the format shown in FIG. 2 and each group of two relating to a different one of the calls requested. More specifically, the information portion of each of the ("call set up") messages 31, 32 . . . contains a specific bit pattern which indicates to the various mobile radios 2 that the message is in fact a "call set up" message, the identification number of a particular mobile radio $2_n$, and the identification number of the channel on which the relevant call is to be effected, respective groups of bits of the information portion being, for example, assigned for each of these purposes. The channel identification number specified in the two "call set up" messages of each group is the same, and the mobile radio 2 specified in the two messages of that group are the respective parties to the relevant call. When each of the messages 31, 32 is received, the specified mobile radio responds to its identification number and the channel number by tuning to the specified channel, and when both parties to the call have done this, the call can be effected. Each channel assigned by the base station 1 in this way is a channel which is unoccupied (i.e. not assigned to speech or signalling) if there be any such channels available at the relevant time. If there are no such channels available the signalling channel is assigned for this purpose and the succession of messages 31, 32 ... is terminated to enable this to be done.

If all calls requested become set up in this way (by the transmission of the various corresponding messages 31, 32, ... ) without the signalling channel becoming assigned to speech, the whole operation is immediately repeated, i.e. the base station 1 transmits another set of messages 10-22 (plus pilot tone) as shown in FIG. 3 on the same channel, any waiting mobile radio $2_n$ responds, and the base station 1 then sends messages to set up any calls requested. On the other hand, if the setting up of the calls requested results in the base station 1 assigning the signalling channel to one of these calls, i.e. if all the channels become assigned to speech, the succession of "call set up" messages 31, 32 ... is terminated as soon as this occurs, as mentioned above. As soon as a channel subsequently becomes free the base station 1 then transmits another set of messages (plus pilot tone) as shown in FIG. 3, the number of messages 28, 29, 30, ... preceding the first new "transmit needs" message 10 being sufficient to enable all the unoccupied mobile radios 2 to lock onto the new signalling channel (which may be the previous signalling channel) before the message 10 is transmitted. Any waiting mobile radios 2 (including any which did not receive an acknowledgment message in response to a "transmit needs" command message transmitted during the previous set of messages 10-27) respond to the new set of "transmit needs" messages exactly as before, the base station 1 sends "acknowledgment" messages where appropriate, and stores the requests received, and then transmits "call set up" messages until either all the requested calls have become set up or all channels have become assigned to speech once more, any calls requested and acknowledged during the previous period when a set of messages 10-27 was sent, and which were not in fact set up then due to all the channels becoming occupied, taking precedence if a "first come, first served" order of priority is employed. (This is not necessarily the case). If a given mobile radio 2 receives no "acknowledgment" message in response to, for example, six "call request" messages transmitted thereby it is arranged to cease to respond to the further "transmit needs" messages transmitted by the base station 1, and notify its operator accordingly.

Figure 4:
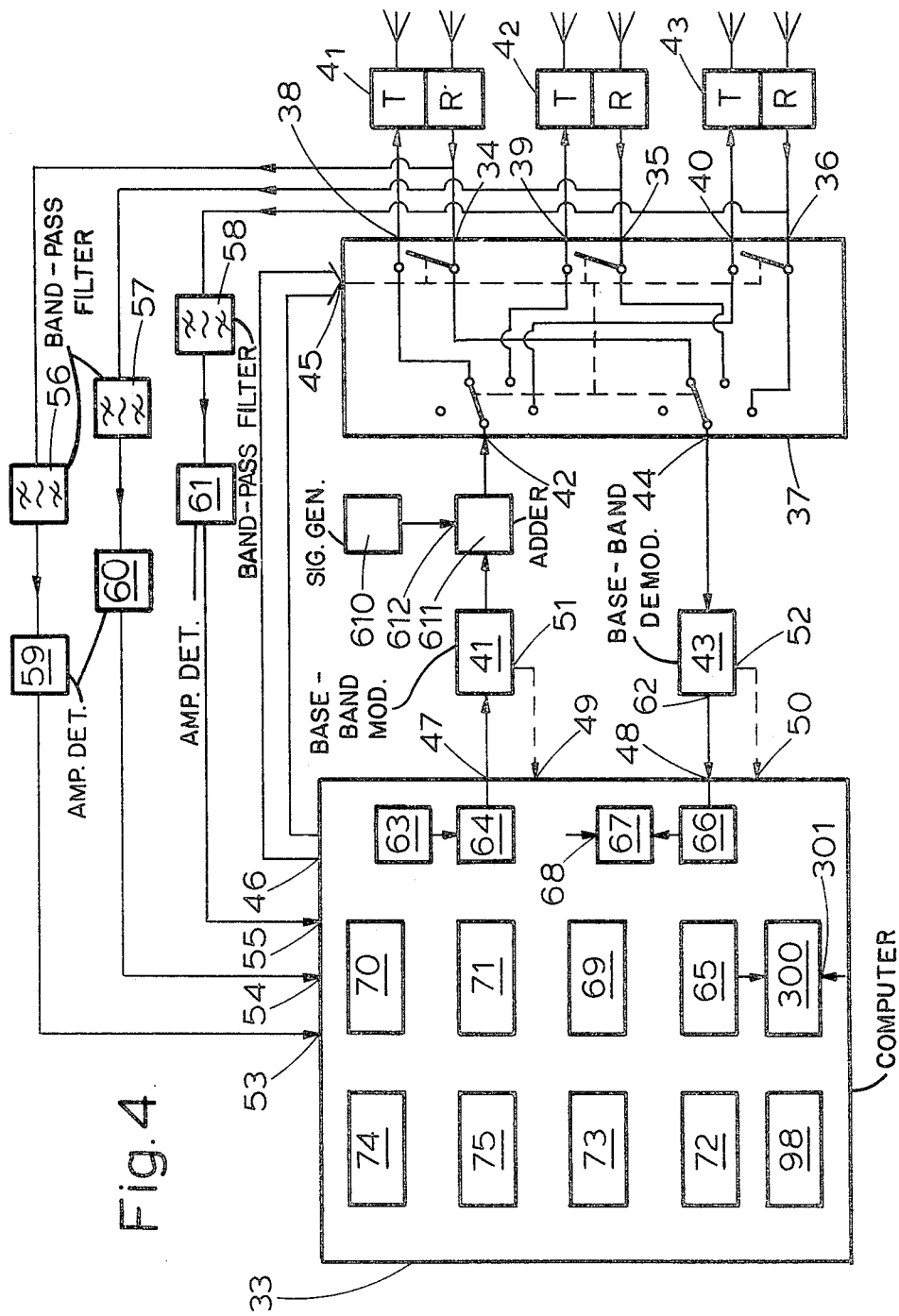
FIG. 4 is a block diagram showing part of the embodiment of FIG. 1 in more detail.

FIG. 4 is a block diagram of the base station 1 of FIG. 1. The receiver portions R of the transmitter/receivers 4 have their demodulated signal outputs coupled to respective inputs 34, 35 and 36 of a switching matrix 37, and the transmitter portions T of the transmitter/receivers 4 have their modulation signal inputs fed from respective outputs 38, 39 and 40 of the matrix 37. A base-band modulator 41 has its output connected to an input 42 of the matrix 37 via a signal combiner (or adder) 611 and a base-band demodulator 43 has its input fed from an output 44 of the matrix 37. A second input 612 of adder 611 is fed from the output of a pilot signal generator 610. The matrix 37 has a control input 45 for a control signal which can have four possible values, which will be designated binary 0, 1, 2, 3 respectively, for convenience. The matrix 37 is constructed so that, when the signal at its control input has the value 0, it adopts a first state in which its input 42 and its output 44 are open circuited, its input 34 is connected to its output 38, its input 35 is connected to its output 39, and its input 36 is connected to its output 40; the output of each receiver section R is therefore connected to the input of the corresponding transmitter section T. When the signal at the control input 45 has the value 1, the matrix 37 adopts a second state in which the switching situation is the same as when the control signal has the value "0", with the exception that the connection between the input 34 and the output 38 is broken and replaced by connections from input 42 to output 38 and from input 34 to output 44 (as shown in FIG. 4). When the signal at the control input 45 has the value 2, the matrix 37 adopts a third state in which the switching situation is the same as when the control signal has the value "0", with the exception that the connection between the input 35 and the output 39 is broken and replaced by connections from input 42 to output 39 and from input 35 to output 44. When the signal at the control input 45 has the value 3, the matrix adopts a fourth state in which the switching situation is the same as when the control signal has the value "0", with the exception that the connection between the input 36 and the output 40 is broken and replaced by connections from input 42 to output 40 and from input 36 to output 44.

The control input 45 is fed from an output 46 of a programmed digital signal processing system (or computer) 33, a further output 47 of which is coupled to the input of the base-band modulator 41, and an input 48, which is fed from the output of the base-band demodulator 43. "Interrupt" signal inputs 49 and 50 of computer 33 are fed from clock signal outputs 51 and 52, respectively, of modulator 41 and demodulator 43, respectively. Further inputs 53, 54 and 55 of the computer 33 are fed from the demodulation signal outputs of the receiver sections of the transmitter/receivers $4_1$, $4_2$ and $4_3$, respectively, via band-pass filters 56, 57 and 58, respectively, and amplitude detectors 59, 60 and 61, respectively.

Base-band modulator 41 includes a clock signal generator (not shown) constructed to generate clock pulses having a repetition rate of 1200 pulses/sec, the output of this clock signal generator being connected to the output 51 of generator 41. Base-band demodulator 43 is constructed in known manner to generate at its output 52 clock pulses in response to the application to demodulator 43 of a digital bit stream from the output 44 of the matrix 37 and bit stream appearing in standardized binary form at the demodulator output 62.

When they are transmitting speech, the mobile radios 2 (FIG. 1) are constructed to also transmit a continuous pilot tone (having a standard frequency of, for example, 100 Hz) modulated on the same carrier. The filters 56, 57 and 58 are tuned to this frequency and the inputs 53, 54 and 55 of the computer 33 therefore carry at all times signals indicative of whether or not the channels corresponding to the transmitter/receivers $4_1$, $4_2$ and $4_3$, respectively, are occupied by speech transmission.

The memory of the processing system (or computer) 33 includes a first set of 120 bit locations 63 (second buffer), a second set of 120 bit locations 64 (output buffer) a third set of 56 bit locations 65, specific locations of which have outputs connected to respective bit positions of one input of a comparator 300, a set of locations 98 for storing received call requests in the form of a queue, and a flag bit location 69. The system 33 also includes a 16-bit shift register 66, the stages of which have their outputs connected to respective bit positions of one input of a 16-bit comparator 67. The signals fed to the 16 bit positions of the second input 68 of comparator 67 are fixed and correspond to respective successive bits of the message header bit pattern 6 (FIG. 2). The signals fed to the respective bit positions of the second input 301 of comparator 300 are also fixed and correspond to respective successive bits of the aforesaid bit pattern in the information portion of each "call request" message transmitted by the mobile radios 2 which signifies that the message is in fact a "call request" message, the first input of comparator 300 being fed from those locations of the set 65 in which said bit pattern will be present if the set 65 is filled with the information portion of such a "call request" message. The system 33 also includes a first (message) ten-counter 70, a second (loop) three-counter 71, a third (input bit) 56-counter 72, a fourth (output bit) 120-counter 73, a fifth (signalling channel indicator) three-state cyclic counter 74, and a sixth (signalling channel indicator counter incrementation) counter 75.

Figure 5A:
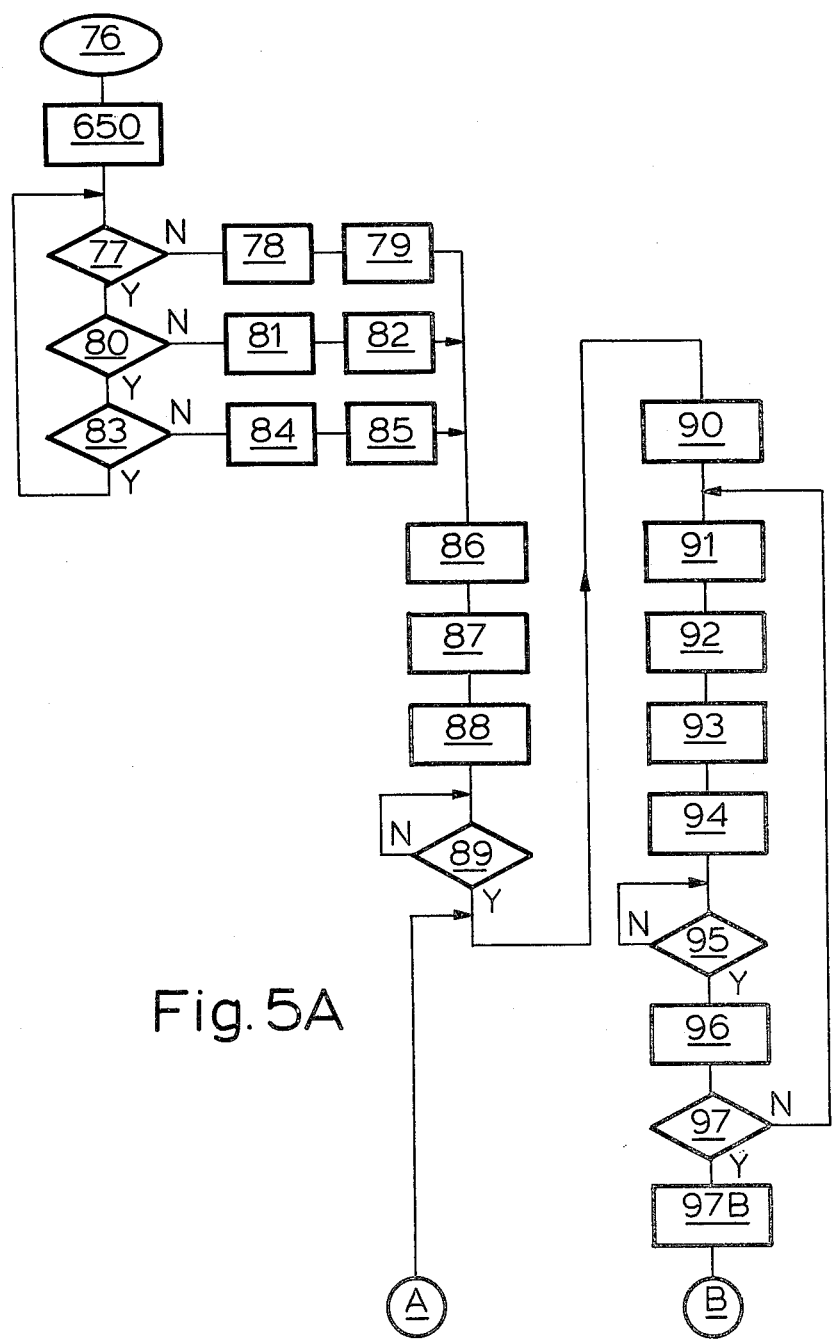
FIGS 5A and 5B show a flow chart of operations occurring in the part of the embodiment shown in FIG. 4.
Figure 5B:
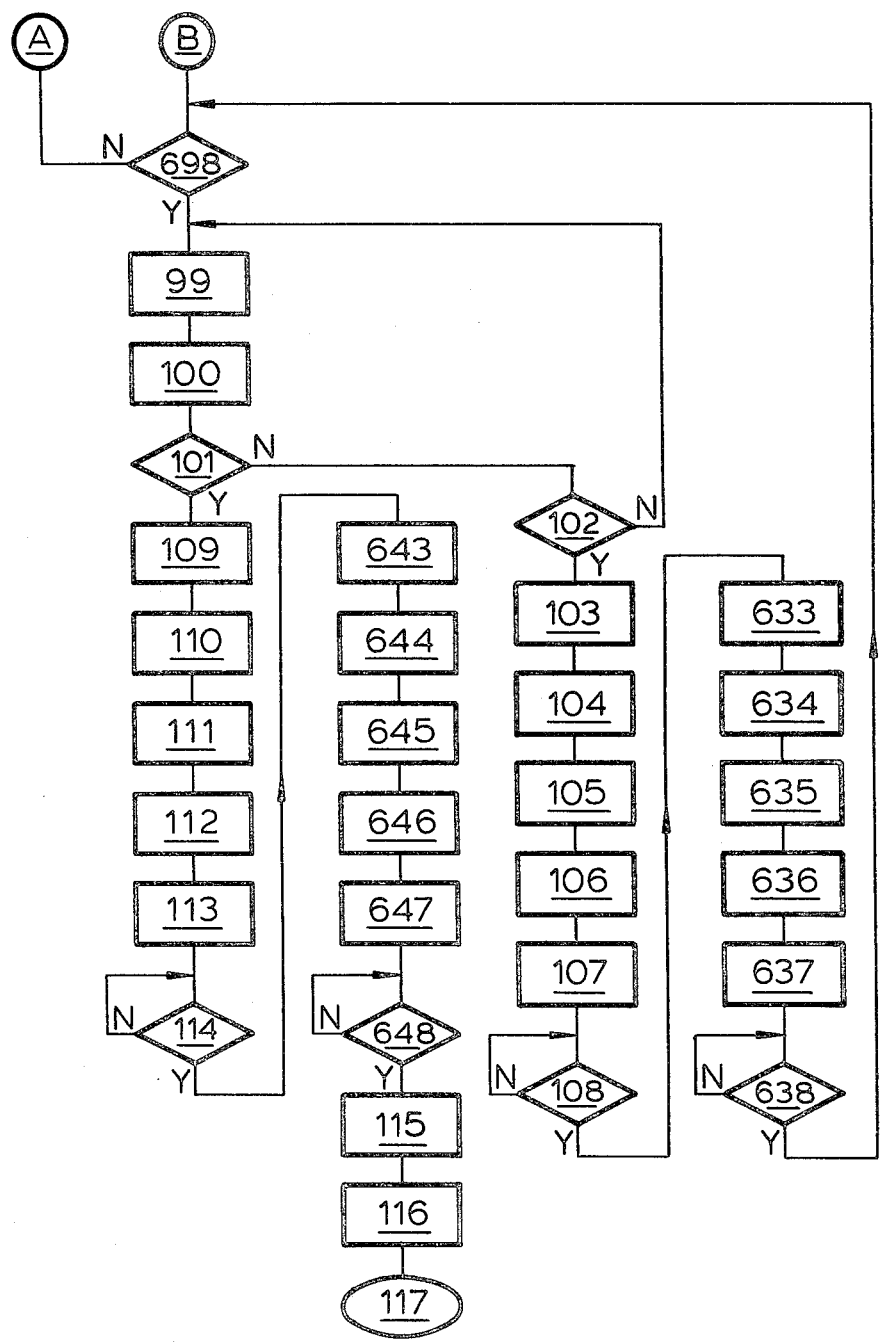

The main program of the system (or computer) 33 is shown in FIGS. 5a and 5b, these Figures being linked as indicated by reference letters. The main program can be interrupted by applying a signal to either input 49 or input 50 of the computer 33, these signals resulting in respective interrupt routines which will be described below. The various steps shown in FIGS. 5a and 5b are as follows:

76—Start. Disable base-band demodulator 43 interrupt (input 50).
650—Set content of output bit counter 73 to 119 and the bit in flag bit location 69 to binary 0.
77—Is channel 1 occupied (is input 53 high)?
78—Set signalling channel indicator counter 74 to lowest count state.
79—Set matrix 37 to second state (as defined above).
80—Is channel 2 occupied (is input 54 high)?
81—Set signalling channel indicator counter 74 to state one higher the lowest count state.
82—Set matrix 37 to third state (as defined above).
83—Is channel 3 occupied (is input 55 high)?
84—Set signalling channel indicator counter 74 to highest count state.
85—Set matrix 37 to fourth state (as defined above).
86—Disable base-band modulator 41 interrupt (input 49).
87—Set message counter 70 and incrementation counter 75 to zero.
88—Enable base-band modulator 41 interrupt (input 49).
89—Is count in message counter 70 equal to ten?
90—Set loop counter 71 to zero.
91—Disable base-band modulator 41 interrupt (input 49).
92—Set message counter 70 to zero.
93—Load "transmit needs" command message (see previously) into set of memory locations 63.
94—Enable base-band modulator 41 interrupt (input 49) and base-band demodulator 43 interrupt (input 50).
95—Is the count in message counter 70 equal to six.
96—Increment loop counter 71 by 1.
97—Is the count in loop counter 71 equal to three?
97B—Disable base-band demodulator interrupt (input 50).
698—Are there any call requests in the queue store 98?
99—Increment signalling channel indicator counter 74 by 1.
100—Increment incrementation counter 75 by 1.
101—Is count in incrementation counter 75 equal to three?
102—Is channel corresponding to present count state of channel indicator counter 74 free?
103—Calculate "call set up" message as defined above, specifying the caller specified in the request at the head of the queue in queue store 98 and the channel corresponding to the count state of channel indicator counter 74.
104—Disable base-band modulator interrupt (input 49).
105—Load result of step 103 into set of memory locations 63.
106—Set message counter 70 to zero.
107—Enable base-band modulator interrupt (input 49).
108—Is count in message counter 70 equal to one?
633—Calculate "call set up" message as defined above, specifying the called party specified in the request from which the caller was derived in the preceding step 103 and the channel corresponding to the count state of channel indicator counter 74.
634—Disable base-band modulator interrupt (input 49).
635—Load result of step 633 into set of memory locations 63.
636—Set message counter 70 to zero.
637—Enable base-band modulator interrupt (input 49).
638—Is count in message counter 70 equal to one?
109—Calculate "call set up" message as defined above, specifying the caller specified in the request at the head of the queue in queue store 98 and the channel corresponding to the count state of channel indicator counter 74.
110—Disable base-band modulator interrupt (input 49).
111—Load result of step 109 into set of memory locations 63.
112—Set message counter 70 to zero.
113—Enable base-band modulator interrupt (input 49).
114—Is count in message counter 70 equal to one?
643—Calculate "call set up" message as defined above, specifying the called party specified in the request from which the caller was derived in the preceding step 109 and the channel corresponding to the count state of channel indicator counter 74.
644—Disable base-band modulator interrupt (input 49).
645—Load result of step 643 into set of memory locations 63.
646—Set message counter 70 to zero.
647—Enable base-band modulator interrupt (input 49).
648—Is count in message counter 70 equal to one?
115—Disable base-band modulator interrupt (input 49).
116—Set matrix 37 to first state (as defined above).
117—Return to 76 (start).

Figure 6:
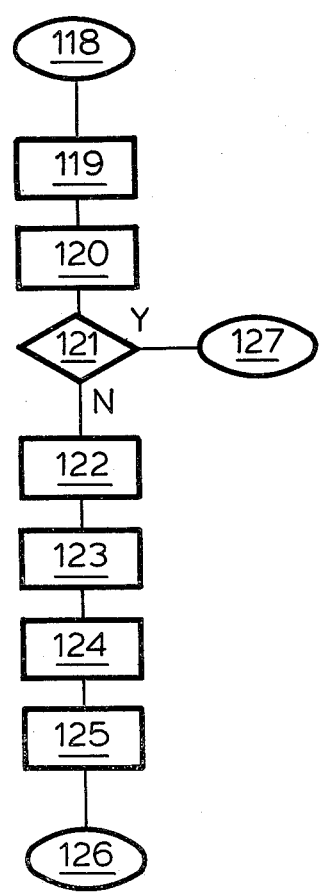
FIG. 6 shows an interrupt routine for the sequence of operations set out in FIG. 5.
Figure 7:
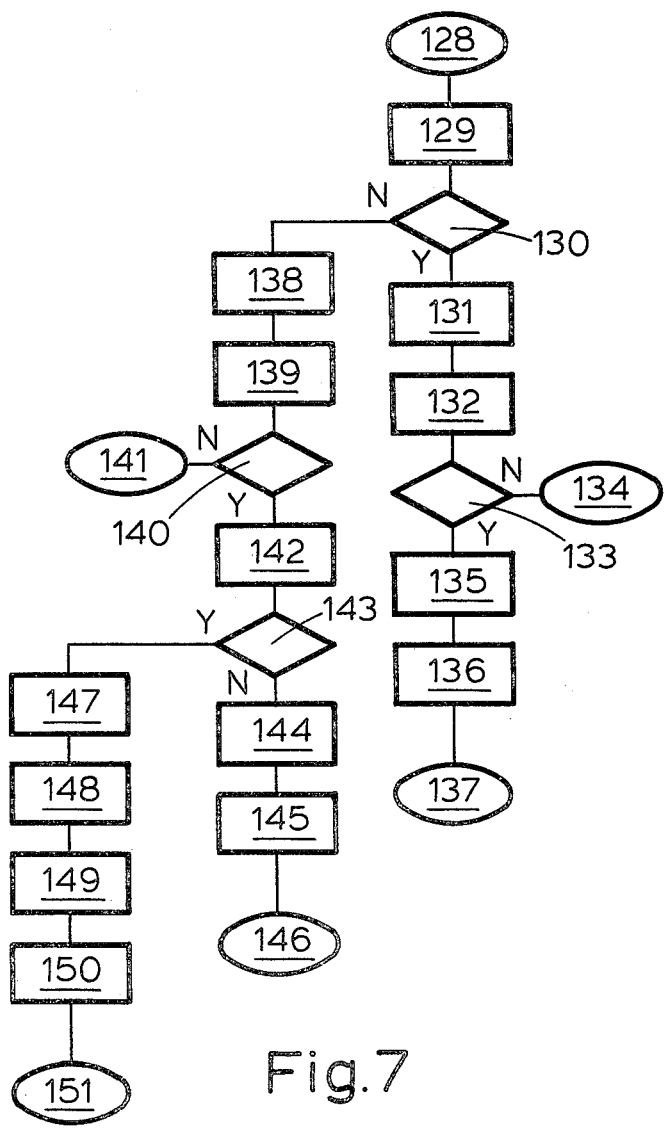
FIG. 7 shows another interrupt routine for the sequence of operations set out in FIG. 5.

The main program shown in FIG. 5 is interrupted each time a signal is applied to either input 49 or input 50 of the computer 33, the interrupt routine shown in FIG. 6 being executed in response to the occurrence of an interrupt signal at input 49 and the interrupt routine shown in FIG. 7 being executed in response to the occurrence of an interrupt signal at input 50. It is arranged that the routine shown in FIG. 6 takes precedence over the routine shown in FIG. 7. In other words, if the routine shown in FIG. 7 is being executed when an interrupt signal is applied to input 49 the routine of FIG. 7 will itself be interrupted by the routine of FIG. 6. Conversely, if the routine shown in FIG. 6 is being executed when an interrupt signal is applied to input 50 the routine of FIG. 7 will be started after the routine of FIG. 6 has been completed.

The steps shown in FIG. 6 are the following:

118—Start (jump from point reached in main program).

119—Take that bit from set of memory locations 64 which has the number equal to the present count in output bit counter 73 and output it at 47.
120—Increment the count in output bit counter 73 by 1.
121—Is the count in output bit counter 73 less than 120?
122—Set the output bit counter 73 to zero.
123—Increment the message counter 70 by 1.
124—Place contents of the set of memory locations 63 into the set of memory locations 64.
125—Place standard "channel identification" message (see previously) into the set of memory locations 63.
126—Return to point reached in main program.
127—Return to point reached in main program.

The steps shown in FIG. 7 are as follows:

128—Start (jump from point reached in main program).
129—Read in output bit of base-band demodulator 43 and store.
130—Is the bit in Flag bit location 69 binary 0?
131—Shift contents of shift register 66 one bit position to the left.
132—Store the bit stored in step 129 in right hand bit location of shift register 66.
133—Does the output of comparator 67 indicate that the 16-bit words at its two inputs correspond?
134—Return to point reached in main program.
135—Set the bit in flag location 69 to binary 1.
136—Set input bit counter 72 to zero.
137—Return to point reached in main program.
138—Store the bit stored in step 129 in that bit location of the set of bit locations 65 which has the number corresponding to the count in input bit counter 72.
139—Increment the count in input bit counter 72 by 1.
140—Is the count in counter 72 equal to 56?
141—Return to point reached in main program.
142—Disable base-band demodulator interrupt (input 50).
143—Is the content of the set of memory locations 65 a "call request" message free of errors (check by means of parity bits and output of comparator 300)?
144—Set the bit in flag location 69 to binary 0.
145—Enable base-band demodulator interrupt (input 50).
146—Return to point reached in main program.
147—Generate the complete acknowledgement message (see previously) specifying the caller indicated in the contents of the set of bit locations 65, and transfer it to the set of memory locations 63.
148—Transfer the contents of the set of bit locations 65 to the queue store 98.
149—Set the bit in flag location 69 to binary 0.
150—Enable base-band demodulator interrupt (input 50).
151—Return to point reached in main program.

It will be seen from FIG. 6 that the base-band modulator 41 of FIG. 4 reads out the contents of the (output buffer) storage locations 64 bit-by-bit in step with the production of successive clock pulses at its output 51. The output of the modulator 41 therefore consists of a continuous succession of 120-bit messages having a bit rate of 1200 bits/sec and in a suitable form for modulation on a carrier transmitted by one of the transmitters T. Thus, for example, modulator 41 may generate a 1200 Hz tone when its input bit is binary "0" and an 1800 Hz tone when its input bit is binary "1". The pilot signal generator 610 adds a continuous point signal having a frequency of, for example, 300 Hz to the output signal of modulator 41 in signal combiner (or adder circuit) 611. Each time a complete 120-bit message has been read out the count in the message counter 70 is incremented by one, the contents of the (second buffer) storage locations 63 are read into the output buffer storage locations 64, and the standard "channel identification" message is written into the set of buffer storage locations 63. Unless the content of the second buffer 63 is replaced by a different type of message the output of the modulator 41 will therefore be a continuous succession of "channel identification" messages.

It will be seen from steps 128-133 of FIG. 7 that the last sixteen bits produced by base-band demodulator 43 are continuously present in shift register 66 until it is recognized that they correspond to the "header" portion of a message. When this occurs the next 56 bits are read into the set of storage locations 65 and checked for errors and to determine whether they correspond to a "call request" message (steps 138-143). If errors are present and/or if they do not correspond to a "call request" message the content of the locations 65 is effectively discarded (steps 144-146). Otherwise the requisite "acknowledgment" message is generated and placed in the second buffer 63 (step 147) and the contents of the message are transferred to the queue of requests in storage locations 98.

It will be seen from FIG. 6 in conjunction with steps 76-89 and 650 of FIG. 5 that, after the start at 76, a free channel is located, the base-band modulator 41, the pilot signal generator 610 and the base-band demodulator 63 are connected to the transmitter/receiver pair $4_n$ corresponding to the free channel, and the modulator 41 then outputs one message which may be arbitrary or a "channel identification" message followed by eight "channel identification" messages while the program is waiting in the loop around step 89. (This is done to enable the unoccupied mobile radios 2 to lock on to the free—now signalling—channel as mentioned previously). The steps 90-95 of FIG. 5 in conjunction with the interrupt routine of FIG. 6 then result in a further "channel identification" message being transmitted, then in transmission of the "transmit needs" message followed by four further messages which will be "channel identification" messages unless one or more of these is replaced by an "acknowledgment" message by means of the routine of FIG. 7. The loop back to step 91 via steps 96 and 97 then results in the transmission twice of a succession of messages comprising one further "channel identification" or "acknowledgment" message, the "transmit needs" message, and four further "channel identification" or "acknowledgment" messages (with, probably, different ones of the "channel identification" messages being replaced by "acknowledgment" messages). After this has occurred one further "channel identification" or "acknowledgment" message is transmitted, followed by pairs of "call set up" messages corresponding to any requests in the queue in storage locations 98 (steps 698, 99-114, 633-638 and 643-648 in conjunction with the routine of FIG. 6) provided that sufficient free channels are available, free channels other than the channel presently being used for signalling being assigned for this purpose, but the signalling channel itself being so assigned if none of the others are free (steps 99-102 and the loops from step 638 to step 698, from step 102 to step 99, and from step 116 to step 76). If no requests are present in the queue after two sequences of one "transmit needs"+five "channel identification" messages followed by one sequence of one "transmit needs"+four "channel identification" messages are transmitted, these three sequences are repeated immediately, preceded by a further "channel identification" message (loop from step 698 to step 90). They are also repeated on the same channel after all requests in the queue have been serviced by the transmission of "call set up" messages (loop from step 638 to step 698 in conjunction with the loop from step 698 to step 90) unless it has been required that the channel at present being used for signalling be assigned to speech, in which case the matrix 37 is caused to disconnect the base-band modulator 41, the pilot signal generator 610 and the base-band demodulator 43 from the transmitter/receivers $4_n$ (step 116) and a search is commenced for a channel which subsequently becomes from (loop from step 116 to step 77).

Figure 8:
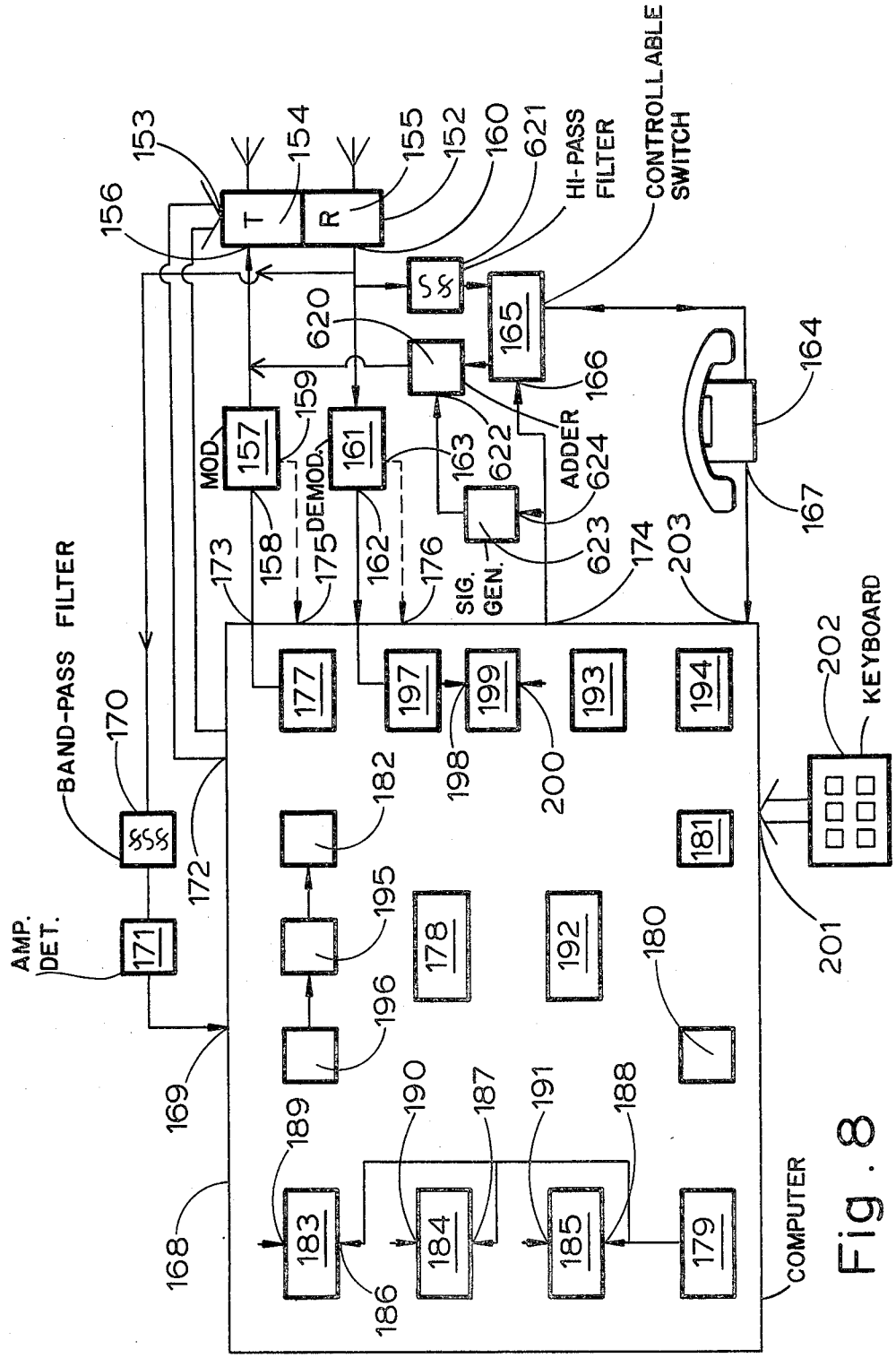
FIG. 8 is a block diagram showing another part of the embodiment of FIG. 4 in more detail.

FIG. 8 is a block diagram of one of the mobile radios 2 of FIG. 1, all of these having the same construction. The mobile radio $2_n$ comprises a transmitter/receiver 152 which can be tuned to each of the three transmission channels of the system by applying corresponding control signals to a control input 153. Thus, when a signal at the control input 153 has a first value, the transmitter and receiver sections 154 and 155, respectively, of transmitter/receiver 152 are tuned to the reception frequency and the transmission frequency, respectively, of the receiver section R and the transmitter section T, respectively, of the transmitter/receiver $4_1$ of FIG. 4, when the signal at the control input 153 has a second value, the transmitter and receiver sections 154 and 155, respectively, are tuned to the reception frequency and the transmission frequency, respectively, of the receiver section R and the transmitter section T, respectively, of the transmitter/receiver $4_2$ of FIG. 4, and when the signal at the control input 153 has a third value, the transmitter and receiver sections 154 and 155, respectively, are tuned to the reception frequency and the transmission frequency, respectively, of the receiver section R and the transmitter section T, respectively, of the transmitter/receiver $4_3$ of FIG. 4.

The modulation signal input 156 of the transmitter section 154 is fed from the output of a base-band modulator 157 which is similar to the modulator 41 of FIG. 4; modulator 157 has a modulation signal input 158 and a clock signal output 159 at which appears a clock signal with a repetition rate of 1200 pulses/sec. The demodulated signal output 160 of the receiver section 155 is coupled to the input of a base-band demodulator 161 which is similar to the demodulator 43 of FIG. 4; demodulator 161 has a demodulated signal output 162 and a clock signal output 163.

A telephone hand-set 164 is connected to the modulation signal input 156 and the demodulated signal output 160 of the transmitter section 154 and the receiver section 155, respectively, via a controllable switch 165, a signal combining (or adder circuit) 620 being included in the signal path from switch 165 to modulation signal input 156 and a high-pass filter 621 being included in the signal path from demodulated signal output 160 to switch 165. A second input 622 of adder circuit 620 is fed with the output of a pilot signal generator 623 which generates a pilot signal having a frequency of, for example, 100 Hz (the same frequency as that to which which the filters 56–58 of FIG. 4 are tuned). The cut-off frequency of filter 621 is at or just higher than the output frequency of generator 623, so that this frequency is prevented from reaching the ear-piece of hand-set 164 (although higher audio frequencies can be transmitted thereto). Switch 165 is controllable between the open and closed states by applying a control signal to a control input 166 thereof. Generator 623 is controllable between the on and off states by applying a control signal to a control input 624 thereof. Hand set 164 is constructed to generate a signal at an output 167 thereof indicative of whether the hand set 164 is in the raised or replaced state.

The mobile radio $2_n$ also includes a programmed digital signal processing system (or computer) 168, an input 169 of which is fed from the demodulated signal output 160 of the receiver section 155 via a band-pass filter 170 and an amplitude detector 171. Filter 170 is tuned to the output frequency of the pilot signal generator 610 of FIG. 4 (e.g. 300 Hz) and therefore produces an output when the receiver section 155 is tuned to a carrier on which this pilot signal is modulated.

An output 172 of computer 168 is connected to the control input 153 of transmitter/receiver 152, an output 173 thereof is connected to the modulation signal input 158 of base-band modulator 157, and an output 174 thereof is connected to the control input 166 of switch 165 and to the control input 624 of generator 623. Interrupt signal inputs 175 and 176 of computer 168 are fed from the clock signal outputs 159 and 163, respectively, of the modulator 157 and the demodulator 161, respectively.

The memory of computer 168 includes a set 177 of 88 bit locations, a set 178 of 88 bit locations, a set 179 of 56 bit locations, and three single-bit locations 180, 181 and 182 for respective flag bits.

The computer 168 also includes three 56-bit comparators 183, 184 and 185, respectively, first inputs 186, 187 and 188, respectively, of which are fed from corresponding locations in the set of storage locations 179, and second inputs 189, 190 and 191, respectively, of which are fed permanently with bit combinations characteristic of the "transmit needs" command message (see previously), the aforementioned "acknowledgment" message characteristic of the particular mobile radio $2_n$, and the aforementioned "call set up" message characteristic of the particular mobile radio $2_n$, respectively. The computer 168 also includes a counter 192 having a capacity of eight, a counter 193 having a capacity of eighty-eight, a counter 194 having a capacity of fifty-six, and a timer counter 195, the count input of which is fed continuously with the 1 kHz output signal of a clock signal generator 196. Furthermore the computer 168 includes a 16-bit shift register 197, the outputs of respective locations of which are fed to corresponding bit positions of the first input 198 of a 16-bit comparator 199. The second input 200 of comparator 199 is fed permanently with a bit combination identical to that which makes up the "header" portion 6 (FIG. 2) of the messages transmitted by the base station 1 of the transmission system.

A further input 201 of computer 168 is fed from the output of a keyboard 202 provided to enable an operator to input details of requests. A further input 203 of computer 168 is fed from the output 167 of the hand set 164.

Figure 10:
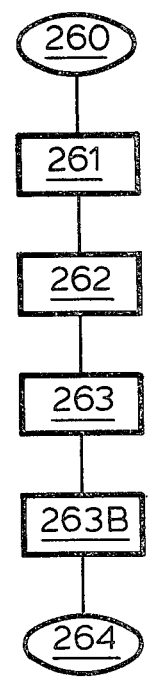
FIG. 10 shows an interrupt routine for the sequence of operations set out in FIG. 9.
Figure 9A:
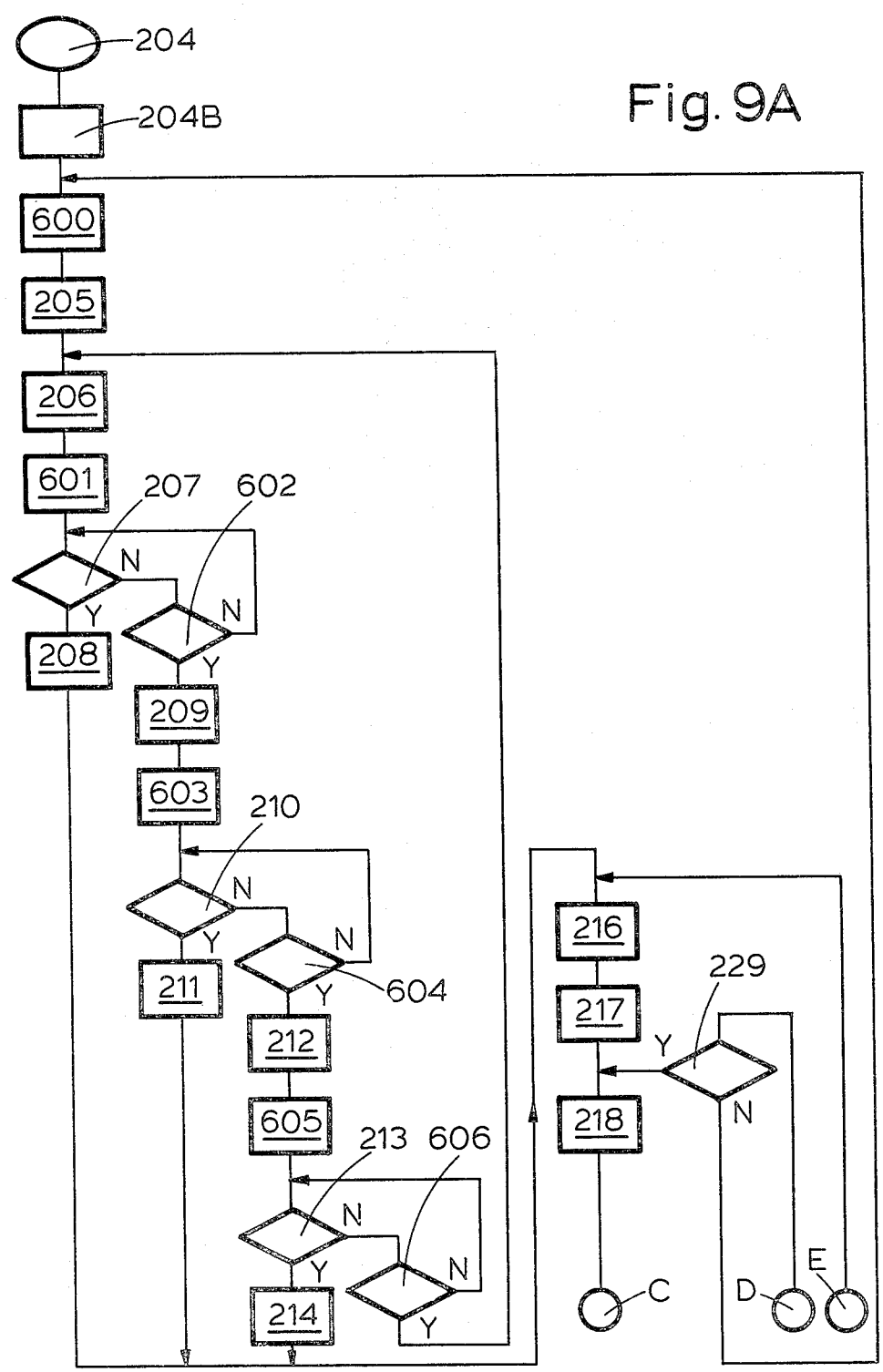
FIGS. 9A–9C show a flow chart of operations occurring in the part of the embodiment shown in FIG. 8.
Figure 9B:
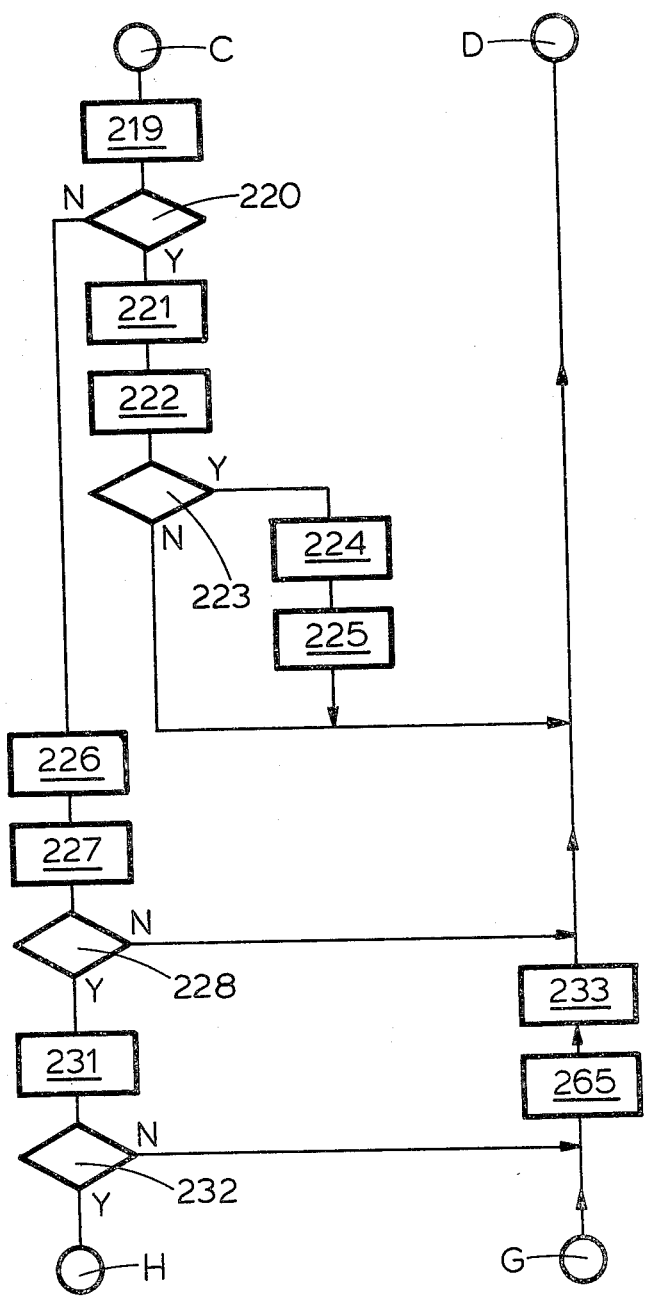
Figure 9C:
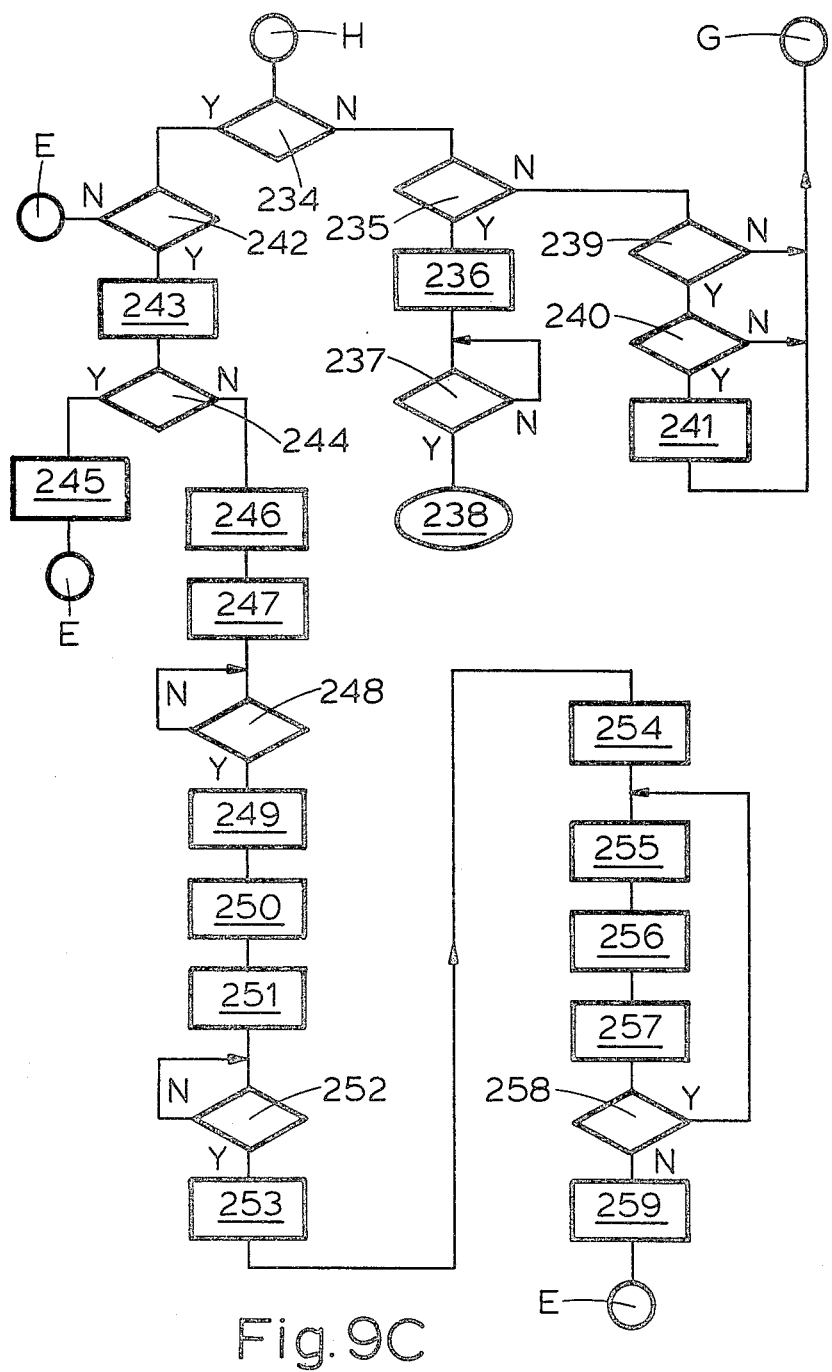

The computer 168 is programmed to perform the sequence of operations set out in the flow chart of FIGS. 9a–9c (which are linked as indicated by preference letters), the procedures carried out when interrupt signals occur at the inputs 175 and 176 being largely similar to the corresponding procedures initiated in the base station 1 computer 33 of FIG. 4 in response to interrupt signals at its corresponding inputs 49 and 50. The program of FIG. 9 can also be interrupted by a further interrupt routine which is shown in FIG. 10, when the mobile radio $2_n$ operator inputs a request on the keyboard 202. It is arranged that an interrupt routine initiated by an interrupt signal at input 175 takes precedence over any interrupt routines initiated by interrupt signals at inputs 176 and 201, and that an interrupt routine initiated by an interrupt signal at input 176 takes precedence over any interrupt routine initiated by an interrupt signal at input 201.

The various steps or operations shown in FIG. 9 are the following:

204—Start.
204B—Set (request waiting) flag 181 to binary "0".
600—Set (timer) flag 182 to binary "0".
205—Disable modulator 157 and demodulator 161 interrupts (inputs 175 and 176).
206—Apply signal of the first value (see previously) to control input 153 of transmitter/receiver 152, i.e. tune transmitter/receiver 152 to channel 1.
601—Set content of (timer count-down) counter 195 to 100.
207—Is channel 1 a signalling channel (is input 169 high)?
602—Has timer counter 195 reached zero? (Is timer flag 182 binary "1")?
208—Fix signal at control input 153 at its first value.
209—Apply signal of the second value (see previously) to control input 153 i.e. tune transmitter/receiver 152 to channel 2.
603—Set content of timer counter 195 to 100.
210—Is channel 2 a signalling channel (is input 169 high)?
604—Has timer counter 195 reached zero? (Is timer flag 182 binary "1")?
211—Fix signal at control input 153 at its second value.
212—Apply signal of the third value (see previously) to control input 153, i.e. tune transmitter/receiver 152 to channel 3.
605—Set content of timer counter 195 to 100.
213—Is channel 3 a signalling channel (is input 169 high)?
606—Has timer counter 195 reached zero? (Is timer flag 182 binary "1")?
214—Fix signal at control input 153 at its third value.
216—Set (header) flag 180 to binary "0".
217—Enable demodulator 161 interrupt (input 176).
218—Wait for next demodulator 161 interrupt (input 176) and continue when received.
219—Read in bit at output 162 of demodulator 161 and store.
220—Is (header) flag 180 binary "0"?
221—Shift contents of register 197 one position to the left.
222—Write bit stored in step 219 in right-hand bit location of register 197.
223—Is content of register 197 the "header"? (Is output of comparator 199 high)?
224—Set (header) flag 180 to binary "1".
225—Set (input bit) counter 194 to zero.
226—Write bit stored in step 219 in that location of the set of locations 179 which corresponds to the present count in counter 194.
227—Increment counter 194 by 1.
228—Is count in counter 194 equal to fifty-six?

229—Is the channel to which transmitter/receiver 152 is tuned still the signalling channel? (Is input 169 still high)?
231—Disable demodulator 161 interrupt (input 176).
232—Is the content of the set of storage locations 179 free from error? (Check by means of parity bits).
233—Enable demodulator 161 interrupt (input 176).
234—Is content of set of storage locations 179 a "transmit needs" command? (Is output of comparator 183 high?).
235—Is contant of set of storage locations 178 a "call set up" message addressed to the relevant mobile radio? (Is output of comparator 185 high?)
236—Switch on transmitter 154, tune transmitter 154 and receiver 155 to channel specified in the message stored in the locations 179 (input 153), close switch 165 (input 166) energise generator 623 (input 624) and generate signal to alert operator.
237—Is call finished, i.e. is hand set replaced (input 203)?
238—Return to start (204).
239—Is count in ("transmit needs" message) counter 192 greater than zero?
240—Is content of set of storage locations 179 an "acknowledgment" message addressed to the relevant mobile radio $2_n$? (Is output of comparator 184 high?).
241—Set (request waiting) flag 181 to binary "0".
242—Is (request waiting) flag 181 binary "1"?
243—Increment "transmit needs" message counter 192 by 1.
244—Is count in counter 192 equal to seven?
245—Set (request waiting) flag 181 to binary "0" and indicate to operator that request has failed.
246—Choose a (slot) number N from the choices 0, 1, 2 and 3 in an effectively random manner.
247—Calculate (P−T+100N−15) where P is the duration of the postambly in milliseconds (27 milliseconds) and T is the time in milliseconds taken to traverse the part of the program from step 226 to the output of step 247, and write the result in (timer count-down) counter 195.
248—Has timer counter 195 reached zero? (Is timer flag 182 binary "1"?).
249—Set timer counter 195 to fifteen.
250—Switch transmitter 154 on.
251—Transfer the content of the set of storage locations 178 to the set of storage locations 177.
252—Has timer counter 195 reached zero? (Is timer flag 182 binary "1"?).
253—Set (output bit) counter 193 to zero.
254—Enable modulator 157 interrupt (input 175).
255—Wait for modulator 157 interrupt (input 175) and proceed when this occurs.
256—Take bit from that location of the set of starage locations 177 which corresponds to the present count in (output bit) counter 193 and output it to input 158 of modulator 157.
257—Increment counter 193 by 1.
258—Is the count in counter 193 less than eighty-eight?
259—Disable modulator 157 interrupt (input 175).
265—Set header flag 180 to binary "0".

The program shown in FIG. 9 can be interrupted by a signal at input 201 generated when an operator inputs a request on the keyboard 202. The routine resulting from this is shown in FIG. 10 where the various steps or procedures are as follows:

260—Jump to here from point reached in main program.
261—Calculate complete 88-bit "call request" message from data inputted on keyboard 202.
262—Write result of operation 261 into the set of storage locations 178.
263—Set "request" flag 181 to binary "1".
263B—Set "transmit needs" message counter 192 to zero.
264—Return to point reached in main program.

It will be seen from FIG. 10 that, whenever a call is requested, the appropriate message is calculated and stored in the set of storage locations 178.

Referring to FIG. 9, steps 206–214, 601–606 result in an initial search occurring for the signalling channel. When such a signalling channel is found the "header" flag 180 is set to zero (step 216). Steps 218–225 then cause the last sixteen bits received to be present continuously in register 197 until it is determined (step 220) that they correspond to the header. When this occurs the next fifty-six bits received are stored in the set of locations 179 (steps 226–228) and it is checked whether they are free from errors (step 232). If they are, it is first checked whether they correspond to a "transmit needs" message (step 234). If they do not, it is then checked (step 235) whether they correspond to a "call set up" message addressed to the particular mobile radio $2_n$. If they do, the handset 164 is connected to the correct channel, and the output of pilot signal generator 623 is concurrently transmitted thereon, for as long as the operator requires (steps 236–238). If the message in the locations 179 is neither a "transmit needs" message nor a relevant "call set up" message, it is then checked whether it is an "acknowledgement" message addressed to the relevant mobile radio $2_n$ (step 240) provided that a relevant "transmit needs" message has been received previously (step 239). If the message is a relevant acknowledgment message, the "request" flag 181 is set to binary "0" and the program returns to the point where the next demodulator 161 interrupt is awaited, so that the next header and hence the next message can be detected. The program also returns to this point (step 218) if the message in the locations 179 is corrupted or is neither a "transmit needs" message, a relevant "call set up" message or a relevant "acknowledgment" message, it being checked each time such a return is made whether the channel to which transmitter/receiver 152 is tuned is still a signalling channel (step 229); if not a search for a new signalling channel is commenced (loop from step 229 to step 600).

If the message in the locations 179 is a "transmit needs" message and it is ascertained (step 242) that an unacknowledged request is present in locations 178 and (step 244) that the message in the locations 179 is not at least the seventh "transmit needs" message to be received after the request was entered, one of the next four time slots is chosen at random for the transmission of the relevant "call request" message (step 246). (If the "transmit needs" message is at least the seventh to be received since an acknowledged request was entered the request is abandoned and the operator informed (step 245)). Transmitter 154 is then switched on 15 ms before the chosen time slot commences (step 247–250) to allow it to stabilise and 15 ms later the call request message, after having been transferred to the (output buffer) locations 177 (step 251), is transmitted (steps 255–258). When the transmission is completed the program returns to a point (216) in the program where it is ready to receive the next message.

It will be appreciated that the various parameters of the system described are only examples of those possible. Thus, for example, a number of "transmit needs" messages other than three, for example one, may be transmitted each time a channel is not required for other purposes. Moreover the number of channels may be different from three, for example one. Moreover the number of time slots between successive "transmit needs" command messages of the same group may be different from five, for example seven. (The various parameters quoted appear to be suitable when the occupancy of the transmission channels is 0.7 erlangs). It will also be appreciated that the format chosen for the various messages is only one of many possible.

We claim:

1. An information transmission system having a first transmitter/receiver and a plurality of further transmitter/receivers which can each communicate with said first transmitter/receiver over the same transmission channel or group of transmission channels, characterized in that said first transmitter/receiver comprises:

means for detecting whether any of said channels are free;

means for transmitting on one of said free channels a sequence of identical command signals each having a limited duration, said command signals being separated one from the other by at least a predetermined number of time slots;

means for receiving on said free channel a digital information message from any one of said further transmitter/receivers in each of said predetermined number of time slots;

means for checking said digital information message for errors and, if said digital information message is error-free, for transmitting back, on said free channel, an acknowledgement signal, for the further transmitter/receiver having transmitted said error-free digital information message, prior to the transmission of a next command signal in said sequence of command signals; and means for assigning, after said sequence of command signals, one of said free channels to each of said further transmitter/receivers to which said acknowledgement signal had been transmitted, for further communication thereon; and characterized in that each of said further transmitter/receivers comprises:

means for scanning said channels and for detecting the channel on which said first transmitter/receiver is transmitting said sequence of command signals;

means for transmitting on said channel said digital information message in one of said predetermined number of time slots, if communication on one of said free channels is desired;

means for detecting whether said first transmitter/receiver transmitted said acknowledgement signal in response to said digital information message;

means for retransmitting said digital information signal after a next command signal in said sequence of command signals if said acknowledgement signal is not received; and means for effecting said communication on said free channel assigned by said first transmitter/receiver.

2. An information transmission system as claimed in claim 1 characterized in that in said first transmitter/ receiver, said checking means transmits said acknowledgement signal in the time slot immediately following the time slot containing said error-free digital information message, or, if said error-free digital information message is in the last of said predetermined number of time slots, in a further time slot immediately following said predetermined number of time slots and preceding the next command signal in said sequence of command signals.

3. An information transmission system as claimed in claim 1 or 2, characterized in that all of the time slots have the same duration and follow each other without intervals therebetween.

* * * * *